(12) United States Patent
Norling et al.

(10) Patent No.: US 7,641,759 B2
(45) Date of Patent: Jan. 5, 2010

(54) METHOD OF JOINING SURFACES

(75) Inventors: Håkan Lars Erik Norling, Stockholm (SE); Eugeniusz Abram, Solna (SE)

(73) Assignee: Akzo Nobel Coatings International B.V., Arnhem (NL)

( * ) Notice: Subject to any disclaimer, the term of this patent is extended or adjusted under 35 U.S.C. 154(b) by 215 days.

(21) Appl. No.: 10/849,031

(22) Filed: May 20, 2004

(65) Prior Publication Data

US 2004/0231791 A1 Nov. 25, 2004

Related U.S. Application Data

(60) Provisional application No. 60/471,749, filed on May 20, 2003.

(51) Int. Cl.
*B32B 7/00* (2006.01)
(52) U.S. Cl. .................................... 156/310; 156/314
(58) Field of Classification Search ............... 156/310, 156/314
See application file for complete search history.

(56) References Cited

U.S. PATENT DOCUMENTS

| | | | |
|---|---|---|---|
| 3,160,543 A | 12/1964 | Elmendorf | 156/306 |
| 3,582,428 A | 6/1971 | Steinberg | 156/288 |
| 3,984,275 A * | 10/1976 | Hofmann et al. | 156/328 |
| 4,183,997 A | 1/1980 | Stofko | |
| 4,431,757 A | 2/1984 | Okitsu | 524/25 |
| 4,483,730 A | 11/1984 | Honda | 156/242 |
| 4,678,532 A | 7/1987 | Perry | 156/314 |
| 4,812,366 A | 3/1989 | Duncan | 428/528 |
| 4,853,061 A | 8/1989 | Leung | 156/216 |
| 5,234,519 A | 8/1993 | Talbot | 156/212 |
| 7,235,608 B2 | 6/2007 | Hu et al. | |
| 2004/0018332 A1 | 1/2004 | Hu et al. | |

FOREIGN PATENT DOCUMENTS

| | | |
|---|---|---|
| EP | 0565752 | 10/1993 |
| EP | 0931822 | 7/1999 |
| EP | 0979712 | 2/2000 |
| EP | 1190823 | 3/2002 |
| RU | 2003244 C1 | 11/1993 |
| RU | 71408 | 3/2008 |
| SU | 516730 | 6/1976 |
| WO | WO02068178 A2 * | 9/2002 |

OTHER PUBLICATIONS

Office Action (translation) in a corresponding Russian application, 4 pages.
English language Abstract of EP0565752.

* cited by examiner

*Primary Examiner*—John L Goff
(74) *Attorney, Agent, or Firm*—Kenyon & Kenyon LLP

(57) ABSTRACT

The present invention relates to a method of joining surfaces, comprising in the following order: applying an adhesive composition (A), comprising a solvent, onto a first surface, drying off the solvent, partially or completely, by forced drying, to give the adhesive composition (A) a solids content of X weight %, directly after the drying step, applying a component (C), comprising a solvent, having a solids content of Z weight %, onto a second surface, wherein Z<X, bringing together the two surfaces so that the adhesive composition (A) is in contact with the component (C), and, pressing the two surfaces against each other. It also relates to a method of producing a wood based product.

44 Claims, No Drawings

METHOD OF JOINING SURFACES

This application claims the benefit of U.S. Provisional Application No. 60/471,749, filed May 20, 2003.

The present invention relates to a method of joining surfaces. It also relates to a method of producing a wood based product.

In the manufacture of glued products such as laminated beams, veneered products, parquet flooring, core board, block board and plywood etc., assemblies of pieces of wooden materials are joined by applying an adhesive followed by a pressing step.

Some adhesives need a comparatively high content of a solvent, such as water, to have a suitable viscosity at application onto a surface. An excess of solvent is usually also required for emulsion based adhesives, also referred to as dispersion adhesives, and resin based adhesives in order to get a stable emulsion or a stable resin based adhesive. At higher solids content of an adhesive, the viscosity increase due to ageing of the emulsion is more pronounced than at lower solids content.

A gluing process involves a physical drying/film formation step and/or a chemical curing step. When an adhesive having comparatively high content of a solvent is used, the pressing time is prolonged in order to enable a sufficient physical drying/film formation process of the adhesive in the glue line. Adhesives which may require long pressing times, are usually those in the form of water-based emulsions, such as polyvinyl acetate adhesives or emulsion-polymer-isocyanate adhesives, or water-based resins of amino- or phenolic type. When using such adhesives, the moisture content of wooden materials to be glued often has to be lowered before gluing so that the final moisture content in the glued wooden product does not become too high. The lowering of the moisture content in combination with application of wet adhesive may give adverse effects due to the changes in moisture content, which may lead to movements in the materials, giving negative effects such as warping.

Another problem when using emulsion based adhesives is a difficulty in gluing together uneven surfaces. During pressing, the applied glue has a tendency to squeeze out, leaving too little left to be able to fill out the distance between the surfaces at all places.

In order to decrease the pressing time required, various solutions have been suggested. For example, EP 1190823 A2 discloses a method including heating of surfaces. Another approach is to dry the adhesive after application. Methods and devices related to drying of applied adhesives are discussed in the following references: U.S. Pat. Nos. 3,160,543, 4,812,366, 5,234,519 and, EP 0979712 A1.

A problem arising when subjecting forced drying to the applied adhesive is that there is a quite narrow maximum time frame available between the forced drying step has ended and when the contacting and pressing of the surfaces has to be made. If too long time passes before the pressing step, the adhesive joint will be too weak due to too early film formation or pre-curing.

None of the cited references mentioned above discloses anything about how to increase or control the maximum amount of time allowed to pass between drying an adhesive layer and a subsequent pressing step. Furthermore, nothing is mentioned about gluing uneven surfaces.

It is an object of the present invention to provide a gluing method which gives high quality joints already at short pressing times, and which provides a long maximum time frame between the end of a forced drying step of an adhesive layer and the start of a subsequent pressing step. There is a further object of the present invention to provide an improved method of joining uneven surfaces.

The above-mentioned objects are achieved by a method of joining surfaces, comprising in the following order: applying an adhesive composition (A), comprising a solvent, onto a surface of a first piece of material, drying off the solvent, partially or completely, by forced drying, to give the adhesive composition (A) a solids content of X weight %, directly after the drying step, applying a component (C), comprising a solvent, having a solids content of Z weight %, onto a surface of a second piece of material, wherein Z<X, bringing together the two surfaces so that the adhesive composition (A) is in contact with the, component (C), and, pressing the two surfaces against each other.

The above-mentioned objects are also achieved by a method of producing a wood-based product comprising, in the following order: applying an adhesive composition (A), comprising a solvent, onto a surface of a first piece of wood-based material, drying off the solvent, partially or completely, by forced drying, to give the adhesive composition (A) a solids content of X weight %, directly after the drying step, applying a component (C), comprising a solvent, having a solids content of Z weight %, onto a surface of a second piece of wood-based material, wherein Z<X, bringing together the two surfaces so that the adhesive composition (A) is in contact with the component (C), and, pressing the two surfaces against each other.

Suitably, the methods comprise in the following order: applying an adhesive composition (B), comprising a solvent, onto the surface of the second piece before applying the component (C), drying off the solvent, partially or completely, by forced drying, from the adhesive composition (B), to give the adhesive composition (B) a solids content of Y weight %, directly after the drying step, wherein Z<Y, and, applying the component (C) onto one or both of the adhesive composition (A) and the adhesive composition (B). The solvent is suitably partially dried off from the adhesive composition (A) and/or adhesive composition (B) applied.

By "adhesive composition" is herein meant a composition which in itself is capable of acting as an adhesive, not merely being a component of an adhesive requiring one or more further components to form an adhesive.

By "solids content" is herein meant the content of constituents of an adhesive, measured according to the following method: 1 g of adhesive is put in a metal lid and subjected to 120° C. in a heating chamber for 30 minutes. The percentage of the adhesive remaining in the lid is defined as the solids content.

By "solvent" is herein meant any substance which is evaporates under the conditions above.

Suitably, from about 10 to about 100 weight % of the solvent is dried off from the adhesive composition (A), preferably from about 20 to about 90 weight %. Suitably, from about 10 to about 100 weight % of the solvent is dried off from the adhesive composition (B), preferably from about 20 to about 90 weight %.

Suitably, X is from about 20 to 100, preferably from about 35 to about 95, most preferably from about 50 to about 90. Suitably, Z is from about 0 to about 70, preferably from about 5 to about 60, most preferably from about 10 to about 50. Suitably, Y is from about 20 to about 100, preferably from about 35 to about 95, most preferably from about 50 to about 90.

The weight ratio applied adhesive composition (A) to component (C) per unit area is suitably from about 1:0.5 to about 50:1, preferably from about 1:1 to about 25:1, most preferably from about 2:1 to about 15:1.

By "forced drying" is herein meant any procedure increasing the drying rate compared to the natural drying of an adhesive layer applied onto a surface occurring due to exposure to ambient air and penetration into the substrate.

The solvent can be dried off by the use of any ways of forced drying, such as dry air, dry gases, air blowing or heating, preferably heating. Examples of suitable ways of heating are radiant heat (IR), warm air blowing, dry air blowing and microwave heating. Preferably, the solvent is dried off by the use of radiant heat.

The adhesive composition (A) and adhesive composition (B) can be of the same composition, or be of different composition. Preferably, the adhesive composition (A) and adhesive composition (B) comprise the same type of adhesive resin. Most preferably, the adhesive composition (A) and adhesive composition (B) are substantially identical. The adhesive composition (A) and adhesive composition (B) suitable for the present method can be any adhesive comprising a solvent. Preferably, the adhesive composition (A) and adhesive composition (B) do not have a polymer comprising an amide or imide bond as the main component.

Preferably, the adhesive compositions (A) and (B) are aqueous adhesive compositions. In one preferred embodiment of the invention, suitably, the adhesive composition (A) and the adhesive composition (B) belong to the group of polymer emulsion based adhesive compositions. In this case, preferred adhesive compositions are those based on polyvinyl acetate, ethylene-vinyl-acetate, emulsion polymer isocyanate, polyurethane, styrene-butadiene, and acrylates. Most preferably, the adhesive composition (A) and the adhesive composition (B) are polyvinyl acetate based adhesive compositions or emulsion polymer isocyanate based adhesive compositions.

In another preferred embodiment of the invention, suitably, the adhesive composition (A) and the adhesive composition (B) belong to the group of curable resin based adhesive compositions. In this case, preferably, the adhesive composition (A) and the adhesive composition (B) are amino resin based or phenolic resin based adhesive compositions.

One or both of the adhesive composition (A) and the adhesive composition (B) may also comprise both a polymer emulsion and a curable resin. One of the adhesive compositions (A) and (B) may also be of a polymer emulsion based adhesive composition while the other belong to the group of curable resin based adhesive compositions.

The original solids content, i.e. the solids content at the time of application, in the adhesive composition (A) and the adhesive composition (B) is suitably from about 1 to about 95 weight %, preferably from about 10 to about 90 weight %, even more preferably from about 30 to about 70 weight %, most preferably from about 40 to about 60 weight %.

The component (C) suitable for the present method is suitably fluid, and can be any component comprising a solvent. In one embodiment of the invention, the component (C) suitably consists substantially of the solvent, preferably substantially of water.

In another embodiment of the invention, the component (C) is suitably an adhesive composition belonging to the group of polymer emulsion based adhesive compositions or curable resin based adhesive compositions. The component (C) is suitably an aqueous adhesive composition. In the case of polymer emulsion based adhesive compositions, preferred adhesive compositions are those based on polyvinyl acetate, ethylene-vinyl-acetate, emulsion polymer isocyanate, polyurethane, styrene-butadiene, and acrylates. Most preferably, the component (C) is a polyvinyl acetate based adhesive composition or an emulsion polymer isocyanate based adhesive composition. In the case of curable resin based adhesive compositions, preferably, the component (C) is an amino resin based or phenolic resin based adhesive composition. The component (C) may also comprise one or more hardeners for one or more curable resins.

The solvent in the adhesive composition (A), the adhesive composition (B), and the component (C), can be any solvent suitable for use in adhesive compositions. Suitably, the solvent is water, or an organic solvent belonging to the group of alcohols, esters, and ketones. Examples of suitable alcohols include methanol, ethanol, propanol, glycols such as ethanediol and propanediol. Preferably, the solvent is water. The solvent in the adhesive composition (A), the adhesive composition (B) and the component (C) may also comprise a combination of solvents. Different solvents may also be used in the adhesive composition (A), the adhesive composition (B), and the component (C).

The pressing of the assembly is suitably performed at a pressure of from about 0.1 to about 10 MPa, preferably from about 0.5 to about 5 MPa, most preferably from about 0.75 to about 3 MPa.

The pressing time may vary, and depends on, for example, the adhesive system used, which product to be produced, and which type of pressing is used. In one suitable type of gluing process, the surfaces to be joined are assembled as a whole before the pressing step. In this case, the pressing time is suitably from about 0.01 to about 3000 seconds, preferably from about 0.1 to about 1000 seconds, most preferably from about 1 to about 60 seconds.

In another suitable type of gluing process, the surfaces to be joined are continuously assembled and pressed, moving through a roller press, band press, or friction press. In these cases the pressing time is suitable from about 0.001 to about 300 seconds, preferably from about 0.1 to about 60 seconds, most preferably from about 1 to about 30 seconds. In the particular case of a roller press, the pressing time is suitably from about 0.001 to about 10 seconds, preferably from about 0.1 to about 1 seconds.

The pressing is suitably performed at conventional ambient temperature, suitably 5-40° C., such as room temperature, without any heat added. In some cases, e.g. when curable resins are present, the pressing is suitably performed under heating. In those cases when heating is desired, the pressing temperature is suitably from about 40 to about 200° C., preferably from about 60 to about 130° C.

In a further embodiment of the invention, the solids contents in applied layers of the adhesive compositions (A) and (B) can be determined by measuring the solvent content in the adhesive layers using, for example, near infra-red (NIR) measuring devices. This enables a precise adjustment of the required drying effect, in terms of intensity and/or drying time, in order to obtain a certain assembly time and/or pressing time. For example, if IR drying is used, a measured value of solvent content can be used to adjust the IR intensity and/or drying time.

The surfaces to be joined in the present method can be of any type of material. Suitably, the surfaces are of lignocellulosic materials including paper, or synthetic or natural polymeric materials. Preferably, the surfaces are of wood-based materials. By wood-based materials is herein also included materials such as fibre-, chip-, and particleboard materials.

The invention is suitable for producing any types of glued products, particularly wood-based glued products such as laminated beams, veneered products, edge-glued products and parquet flooring.

In a preferred embodiment of the invention an aqueous dispersion of a polyvinyl acetate adhesive is applied onto one surface each of two pieces of wooden materials, whereupon water is dried off by using infra-red radiation so that the adhesive compositions both have a solids content of from about 60 to about 80 weight %. After some minutes, an aqueous dispersion of the same polyvinyl acetate adhesive dispersion is applied onto one of the dried adhesive layers and the two pieces are assembled and pressed together.

In another preferred embodiment of the invention an aqueous dispersion of a polyvinyl acetate adhesive is applied onto a surface of a piece of wooden material, whereupon water is dried off by using infra-red radiation so that the adhesive composition has a solids content of from about 60 to about 80 weight %. After some minutes, an aqueous dispersion of the same polyvinyl acetate adhesive dispersion is applied onto another surface of a piece of wooden material and the two pieces are assembled and pressed together.

The invention will now further be described in connection with the following examples which, however, not should be interpreted as limiting the scope of the invention.

EXAMPLES

Example 1

A two-ply product was made using a water-based polyvinyl acetate adhesive having an original solids content of 50 weight %. The ambient temperature was 20° C. Two wooden pieces of 16 mm thickness of the size 140 mm×50 mm were coated with 75 g/m² adhesive having an original solids content of 50 weight %. The adhesive layers of each piece were dried by heating using infra-red radiation so that both adhesive layers had a solids content (X, Y) of about 70 weight %. The new solids contents were determined by weighing the pieces. The pieces were then brought in contact with each other directly and pressed together at a pressure of 1.5 MPa for 10 minutes. The time span between drying the adhesive layers and the contacting of the layers was below 10 seconds. The adhesive strength was measured by doing a "chisel test" directly after pressing. In this test the two glued pieces are forced apart by using a chisel and the percentage of the glued surface that show fibre tear is determined.

Example 2

The same procedure as in Example 1 was repeated, except that the surfaces with applied adhesive were not brought in contact with each other until 2 minutes had passed after drying. The solids contents were determined by weighing the pieces both directly after heating and just before pressing. The adhesive strength measured by using the "chisel test".

Example 3 (the Invention)

A two-ply product was made following the same steps as in Example 1, except that the surfaces with applied adhesive were allowed to rest for 2 minutes followed by application of additional adhesive to one of the surfaces. The adhesive was of the same type as before but with a solids content (Z) of 25 weight % and applied in an amount of 21 g/m². The surfaces were then brought in contact with each other and the assembly was pressed at a pressure of 1.5 MPa for 10 minutes. The adhesive strength measured by using the "chisel test".

Example 4 (the Invention)

A two-ply product of the same material and size as in examples 1-3, and by using the same type of adhesive, was made. However, only one of the pieces was coated, with 100 g/m² of adhesive, having an original solids content of 50 weight %. The adhesive layer was subsequently dried to a solids content (X) of about 65 weight %, and allowed to rest for 2 minutes. The other piece was then coated with an adhesive of the same type as before but with a solids content (Z) of 25 weight % and applied in an amount of 60 g/m². The surfaces were then brought in contact with each other and the assembly was pressed at a pressure of 1.5 MPa for 10 minutes. The adhesive strength measured by using the "chisel test".

The results are presented in Table 1.

TABLE 1

| Time between drying and pressing | Adhesive strength (% fibre tear) | | |
| --- | --- | --- | --- |
| | Example 1 & 2 | Example 3 | Example 4 |
| <10 seconds | 75-80 | 75-80 | — |
| 2 minutes | 30-40 | 70-80 | 70 |

It is concluded from Examples 1-4 that the method of the present invention gives excellent adhesive strength also when a certain period of time has passed between drying and pressing.

The invention claimed is:

1. A method of joining surfaces, comprising in the following order:
   applying an adhesive composition (A), comprising a solvent, onto a surface of a first piece of material,
   applying an adhesive composition (B), comprising a solvent, onto a surface of a second piece of material,
   drying off the solvent, partially or completely, by forced drying, from the adhesive composition (A), to give the adhesive composition (A) a solids content of X weight %, directly after the drying step,
   drying off the solvent, partially or completely, by forced drying, from the adhesive composition (B), to give the adhesive composition (B) a solids content of Y weight %, directly after the drying step, and,
   wherein the method further comprises in the following order:
   applying a component (C), comprising a solvent, having a solids content of Z from about 5 to about 60 weight %, onto adhesive composition (B) or both of the adhesive composition (A) and the adhesive composition (B), wherein Z<X, and Z<Y,
   bringing together the two surfaces so that both of the adhesive composition (A) and the adhesive composition (B) are in contact with the component (C), and,
   pressing the two surfaces against each other.

2. A method according to claim 1, wherein from about 10 to about 100 weight % of the solvent is dried off from the adhesive composition (A).

3. A method according to claim 1, wherein at least 10 to about 100 weight % of the solvent is dried off from the adhesive composition (B).

4. A method according to claim 1 wherein X is from about 50 to about 90.

5. A method according to claim 1, wherein Z is from about 10 to about 50.

6. A method according to claim 1, wherein Y is from about 50 to about 90.

7. A method according to claim 1, wherein the weight ratio applied adhesive composition (A) to component (C) per unit area is from about 2:1 to about 15:1.

8. A method according to claim 1, wherein the adhesive composition (A) belongs to the group of emulsion polymer based adhesive compositions.

9. A method according to claim 1, wherein the adhesive composition (A) belongs to the group of curable resin based adhesive compositions.

10. A method according to claim 1, wherein the component (C) is an adhesive composition belonging to the group of emulsion polymer based adhesive compositions.

11. A method according to claim 1, wherein the component (C) is an adhesive composition belonging to the group of curable resin based adhesive compositions.

12. A method according to claim 1, wherein the solvent is water.

13. A method according to claim 11, wherein the component (C) comprises one or more hardeners for the one or more curable resins.

14. A method according to claim 1, wherein the surfaces are of wood-based materials.

15. A method of producing a wood-based product comprising, in the following order:
  applying an adhesive composition (A), comprising a solvent, onto a surface of a first piece of wood-based material,
  applying an adhesive composition (B), comprising a solvent, onto a surface of a second piece of wood-based material,
  drying off the solvent, partially or completely, by forced drying, from the adhesive composition (A), to give the adhesive composition (A) a solids content of X weight %, directly after the drying step,
  drying off the solvent, partially or completely, by forced drying, from the adhesive composition (B), to give the adhesive composition (B) a solids content of Y weight %, directly after the drying step, and,
    wherein the method further comprises in the following order:
  applying a component (C), comprising a solvent, having a solids content of Z of from about 5 to about 60 weight %, onto adhesive composition (B) or both of the adhesive composition (A) and the adhesive composition (B), wherein Z<X and Z<Y,
  bringing together the two surfaces so that both of the adhesive composition (A) and the adhesive composition (B) are in contact with the component (C), and,
  pressing the two surfaces against each other.

16. A method according to claim 15, wherein from about 10 to about 100 weight % of the solvent is dried off from the adhesive composition (A).

17. A method according to claim 15, wherein at least 10 to about 100 weight % of the solvent is dried off from the adhesive composition (B).

18. A method according to claim 15, wherein X is from about 50 to about 90.

19. A method according to claim 15, wherein Y is from about 50 to about 90.

20. A method according to claim 15, wherein the weight ratio applied adhesive composition (A) to component (C) per unit area is from about 2:1 to about 15:1.

21. A method according to claim 15, wherein the adhesive composition (A) belongs to the group of emulsion polymer based adhesive compositions.

22. A method according to claim 15, wherein the adhesive composition (A) belongs to the group of curable resin based adhesive compositions.

23. A method according to claim 15, wherein the component (C) is an adhesive composition belonging to the group of emulsion polymer based adhesive compositions.

24. A method according to claim 15, wherein the component (C) is an adhesive composition belonging to the group of curable resin based adhesive compositions.

25. A method according to claim 15, wherein the solvent is water.

26. A method according to claim 24, wherein the component (C) comprises one or more hardeners for the one or more curable resins.

27. A method according to claim 15, wherein the wood-based product is a laminated beam.

28. A method according to claim 15, wherein the wood-based product is an edge-glued product.

29. A method according to claim 15, wherein the wood-based product is parquet flooring.

30. A method according to claim 1, wherein the adhesive composition (B) belongs to the group of emulsion polymer based adhesive compositions.

31. A method according to claim 1, wherein the adhesive composition (B) belongs to the group of curable resin based adhesive compositions.

32. A method according to claim 15, wherein the adhesive composition (B) belongs to the group of emulsion polymer based adhesive compositions.

33. A method according to claim 15, wherein the adhesive composition (B) belongs to the group of curable resin based adhesive compositions.

34. A method of producing a wood-based product comprising:
  applying an adhesive composition (A), comprising a solvent, onto a surface of a first piece of wood-based material,
  applying an adhesive composition (B), comprising a solvent, onto the surface of a second piece of wood-based material,
  drying off the solvent, partially or completely, by forced drying, to give the adhesive composition (A) a solids content of X weight %, directly after the drying step,
  drying off the solvent, partially or completely, by forced drying, from the adhesive composition (B), to give the adhesive composition (B) a solids content of Y weight %, directly after the drying step, and,
    wherein the method further comprises in the following order:
  applying a component (C), having a solids content Z of from about 10 to about 50 weight %, onto adhesive composition (B) or both of the adhesive composition (A) and the adhesive composition (B), wherein Z<X and Z<Y,
  bringing together the two surfaces so that both adhesive compositions (A) and (B) are in contact with the component (C), and,
  pressing the two surfaces against each other.

35. A method according to claim 34, wherein from about 10 to about 100 weight % of the solvent is dried off from the adhesive composition (A).

36. A method according to claim 34, wherein at least 10 to about 100 weight % of the solvent is dried off from the adhesive composition (B).

37. A method according to claim 34, wherein X is from about 50 to about 90.

38. A method according to claim 34, wherein Y is from about 50 to about 90.

39. A method according to claim 34, wherein the adhesive composition (A) and the adhesive composition (B) belong to the group of emulsion polymer based adhesive compositions.

40. A method according to claim 34, wherein the adhesive composition (A) and the adhesive composition (B) belong to the group of curable resin based adhesive compositions.

41. A method according to claim 34, wherein the component (C) is an adhesive composition belonging to the group of emulsion polymer based adhesive compositions.

42. A method according to claim 34, wherein the component (C) is an adhesive composition belonging to the group of curable resin based adhesive compositions.

43. A method according to claim 34, wherein the solvent is water.

44. A method according to claim 34, wherein the component (C) consists substantially of water.

* * * * *

UNITED STATES PATENT AND TRADEMARK OFFICE
CERTIFICATE OF CORRECTION

PATENT NO. : 7,641,759 B2  Page 1 of 1
APPLICATION NO. : 10/849031
DATED : January 5, 2010
INVENTOR(S) : Norling et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 721 days.

Signed and Sealed this

Sixteenth Day of November, 2010

David J. Kappos
*Director of the United States Patent and Trademark Office*